US012663354B2

(12) United States Patent     (10) Patent No.:     US 12,663,354 B2

Sakuramoto et al.     (45) Date of Patent:     Jun. 23, 2026

(54) DILUTION MECHANISM, PARTICLE SIZE DISTRIBUTION MEASUREMENT SYSTEM, PARTICLE SIZE DISTRIBUTION MEASUREMENT METHOD, AND PROGRAM FOR PARTICLE SIZE DISTRIBUTION MEASUREMENT

(71) Applicants: HORIBA, Ltd., Kyoto (JP); HORIBA Advanced Techno, Co., Ltd., Kyoto (JP)

(72) Inventors: Keijiro Sakuramoto, Kyoto (JP); Tetsuya Mori, Kyoto (JP); Kazunori Habu, Kyoto (JP)

(73) Assignees: HORIBA, LTD., Kyoto (JP); HORIBA ADVANCED TECHNO, CO., LTD., Kyoto (JP)

( * ) Notice: Subject to any disclaimer, the term of this patent is extended or adjusted under 35 U.S.C. 154(b) by 96 days.

(21) Appl. No.: 18/728,729

(22) PCT Filed: Jan. 17, 2023

(86) PCT No.: PCT/JP2023/001142

§ 371 (c)(1),
(2) Date: Jul. 12, 2024

(87) PCT Pub. No.: WO2023/140245

PCT Pub. Date: Jul. 27, 2023

(65) Prior Publication Data

US 2025/0137902 A1     May 1, 2025

(30) Foreign Application Priority Data

Jan. 21, 2022     (JP) ................................ 2022-007802

(51) Int. Cl.
*G01N 15/06*     (2024.01)
*G01N 1/38*     (2006.01)
*G01N 15/14*     (2024.01)

(52) U.S. Cl.
CPC ........... *G01N 15/0656* (2013.01); *G01N 1/38* (2013.01); *G01N 15/1425* (2013.01); *G01N 2015/1493* (2013.01)

(58) Field of Classification Search
CPC .. G01N 15/0656; G01N 1/38; G01N 15/1425; G01N 2015/1493;

(Continued)

(56) References Cited

U.S. PATENT DOCUMENTS

| | | | |
|---|---|---|---|
| 6,122,956 A | 9/2000 | Klausner et al. | |
| 7,180,592 B2 * | 2/2007 | Yoshioka | ........... G01N 15/0205 356/336 |

(Continued)

FOREIGN PATENT DOCUMENTS

| | | |
|---|---|---|
| JP | 2002-022644 A | 1/2002 |
| JP | 2002-513151 A | 5/2002 |

(Continued)

OTHER PUBLICATIONS

International Search Report dated Mar. 7, 2023, issued for the corresponding International patent application No. PCT/JP2023/001142, with English translation (8 pages).

*Primary Examiner* — Md M Rahman
(74) *Attorney, Agent, or Firm* — LUCAS & MERCANTI, LLP

(57)     ABSTRACT

A dilution mechanism includes: a sample line that guides the sample containing the particles to the particle size distribution measurement device; a dilution line that merges with the sample line and through which a diluent flows; a concentration adjusting unit that adjusts the concentration of the (Continued)

particles contained in the diluted sample; a conductivity measuring unit that measures a conductivity of the diluted sample; a control unit that controls the concentration adjusting unit to bring the conductivity measured by the conductivity measuring unit or a conductivity-related value that is a value calculated from the conductivity, to a predetermined target value.

9 Claims, 5 Drawing Sheets

(58) Field of Classification Search
CPC ..... G01N 2001/386; G01N 2015/0038; G01N 2015/0053; G01N 2015/0222; G01N 15/0211
USPC ........................................................ 356/336
See application file for complete search history.

(56) References Cited

U.S. PATENT DOCUMENTS

| | | | | |
|---|---|---|---|---|
| 2014/0315288 A1* | 10/2014 | Miyamura | ......... | G01N 33/5094 29/428 |
| 2016/0018314 A1* | 1/2016 | Hamada | ............. | G01N 15/1459 435/288.7 |

FOREIGN PATENT DOCUMENTS

| | | |
|---|---|---|
| JP | 2002-527740 A | 8/2002 |
| JP | 2004-053431 A | 2/2004 |
| JP | 2004-537737 A | 12/2004 |
| JP | 2005-512042 A | 4/2005 |
| JP | 2006-064623 A | 3/2006 |
| WO | 99/56106 A1 | 11/1999 |
| WO | 00/22407 A2 | 4/2000 |
| WO | 03/014729 A1 | 2/2003 |
| WO | 03/048728 A2 | 6/2003 |

* cited by examiner

DILUTION MECHANISM, PARTICLE SIZE DISTRIBUTION MEASUREMENT SYSTEM, PARTICLE SIZE DISTRIBUTION MEASUREMENT METHOD, AND PROGRAM FOR PARTICLE SIZE DISTRIBUTION MEASUREMENT

CROSS REFERENCE TO RELATED APPLICATION

This Application is a 371 of PCT/JP2023/001142 filed on Jan. 17, 2023, which, in turn, claims priority of Japanese Patent Application No. 2022-007802 filed on Jan. 21, 2022, and the above applications are incorporated herein by reference.

TECHNICAL FIELD

The present invention relates to a dilution mechanism, a particle size distribution measurement system, a particle size distribution measurement method, and a particle size distribution measurement program.

BACKGROUND ART

In processes such as semiconductor manufacturing processes, particles, such as those in a slurry, may be used for polishing semiconductors. If the size of any of such particles are too large, semiconductors may become damaged. To address such a problem, a particle size distribution measurement device, i.e., particle size analyzer, using the dynamic light scattering technique is sometimes used online (Patent Literature 1).

In such a case, if the concentration of the sample guided to the particle size distribution measurement device is high, the measurement accuracy deteriorates because of the multiple scattering. Therefore, in order to ensure a measurement accuracy, the sample collected from the line need to be diluted before measurement.

Furthermore, particle size distribution measurements collected using the dynamic light scattering technique are concentration-dependent. Therefore, from this viewpoint, too, to ensure the measurement accuracy, it is necessary to control the concentration of the diluted sample to be constant. As an example of the online concentration measurement, a method for detecting the intensity of transmitted light or scattered light has been known.

In order to detect the intensity of transmitted light, it is necessary to increase the concentration of the sample to some extent; however, multiple scattering described above is more likely to occur when the concentration is high. Therefore, the method for detecting the intensity of transmitted light is not suitable for the use with particle diameter distribution measurements using the dynamic light scattering technique. Furthermore, when the particle size is extremely small (e.g., in the order of nanometers), the intensity of the resultant transmitted light becomes very high and the ratio of the change in the light intensity becomes very low, so that the accurate concentration control becomes difficult, disadvantageously.

Moreover, with the method for detecting the intensity of scattered light, because the scattered light intensity is dependent on the particle size distribution, merely with the detection of the scattered light at a certain scatter angle, concentrations can be obtained only when the particle size distribution remains constant; hence, the accurate concentration control becomes difficult when there is variability in the particle size distribution. However, in order to detect scattered light at a large number of scattering angles, a large detector would be required, and online handling would become difficult.

CITATION LIST

Patent Literatures

Patent Literature 1: JP 2002-22644 A

SUMMARY OF INVENTION

Technical Problem

Therefore, the present invention has been made to solve the problems described above all at once, and a main object of the present invention is to enable highly accurate control of particle concentration of a sample, even when there is variability in the particle size distribution of the particles contained in the sample, to ensure the accuracy of particle size distribution measurements using the dynamic light scattering technique.

Solution to Problem

That is, a dilution mechanism according to the present invention is a dilution mechanism used with a particle size distribution measurement device that measures a particle size distribution using a dynamic light scattering technique, the dilution mechanism including: a sample line that guides a sample containing particles to the particle size distribution measurement device; a dilution line that merges with the sample line and through which a diluent flows; a concentration adjusting unit that adjusts a concentration of particles contained in diluted sample; a conductivity measuring unit that measures a conductivity of the diluted sample; and a control unit that controls the concentration adjusting unit to bring the conductivity measured by the conductivity measuring unit or to bring a conductivity-related value that is a value calculated from the conductivity, to a predetermined target value.

With the dilution mechanism having the configuration described above, the concentration control unit is controlled to adjust the conductivity of the sample or the conductivity-related value calculated from the conductivity, to a predetermined target value. Therefore, even with a sample having a variable particle size distribution, it is possible to control the particle concentration of the sample highly accurately, unlike the configuration that controls the concentration using the intensity of transmitted light or scattered light. As a result, it becomes possible to ensure the measurement accuracy of the particle size distribution measurement device.

Preferably, the dilution mechanism further includes a concentration calculation unit that calculates a concentration of the particles in the diluted sample as the conductivity-related value, from the conductivity measured by the conductivity measuring unit, and the control unit controls the concentration adjusting unit to bring the concentration calculated by the concentration calculation unit to the target value.

With this, it becomes possible to control the particle concentration of the sample directly. Hence, it becomes possible to ensure the measurement accuracy of the particle size distribution measurement device, more reliably.

A more specific embodiment includes an example in which the dilution mechanism further includes a correlation data storage unit that stores correlation data indicating a correlation between the conductivity of the diluted sample and the particle concentration of the sample, and the concentration calculation unit is configured to calculate the concentration of the particles contained in the diluted sample using the correlation data.

The concentration adjusting unit may be a fluid control valve provided to at least one of the sample line and the dilution line, for example.

With this configuration, it is possible to control the concentration using a simple and inexpensive structure.

Preferably, the sample line is configured to collect the sample from a manufacturing system used in a predetermined manufacturing process.

With this, it becomes possible to make online measurement of a particle size distribution of particles used in the manufacturing system.

An example for making the action and effect of the dilution mechanism described above more remarkable includes an example in which the sample contains a chemical component resulting a correlation between the concentration of particles contained in the sample and the conductivity of the sample.

A particle size distribution measurement system according to the present invention includes the dilution mechanism described above and a particle size distribution measurement device that measures a particle size distribution of particles contained in the sample diluted by the dilution mechanism, using a dynamic light scattering technique.

A particle size distribution measurement method according to the present invention is a particle size distribution measurement method for measuring a particle size distribution using a dynamic light scattering technique, the method including: a step of guiding a sample containing particles to a particle size distribution measurement device through a sample line; a step of merging a diluent to the sample line; a step of adjusting a concentration of the particles contained in the diluted sample using a concentration adjusting unit; a step of measuring conductivity of the diluted sample using a conductivity measuring unit; and a step of controlling the concentration adjusting unit to bring the conductivity measured by the conductivity measuring unit or to bring a conductivity-related value that is a value calculated from the conductivity, to a predetermined target value.

A particle size distribution measurement program according to the present invention is a program used in a particle size distribution measurement system including: a particle size distribution measurement device that measures a particle size distribution using a dynamic light scattering technique; a sample line that guides a sample containing particles to the particle size distribution measurement device; a dilution line that merges with the sample line and through which a diluent flows; a concentration adjusting unit that adjusts a concentration of the particles in the diluted sample; and a conductivity measuring unit that measures conductivity of the diluted sample, the program causing a computer to exhibit a function as a control unit that controls the concentration adjusting unit to bring the conductivity measured by the conductivity measuring unit or to bring a conductivity-related value that is a value calculated from the conductivity, to a predetermined target value.

With the particle size distribution measurement system, the particle size distribution measurement method, and the particle size distribution measurement program having the configurations described above, it is possible to exert the same operation and effect as the operation and effect achieved with the dilution mechanism described above.

Advantageous Effects of Invention

According to the present invention having the configuration described above, in the particle size distribution measurement using the dynamic light scattering technique, even when there is variability in the particle size distribution of the particles contained in the sample, it is possible to control the particle concentration of the sample accurately so that accurate measurements can be obtained.

DESCRIPTION OF EMBODIMENTS

One embodiment of a particle size distribution measurement system according to the present invention will now be described with reference to the drawings.

Figure 1:
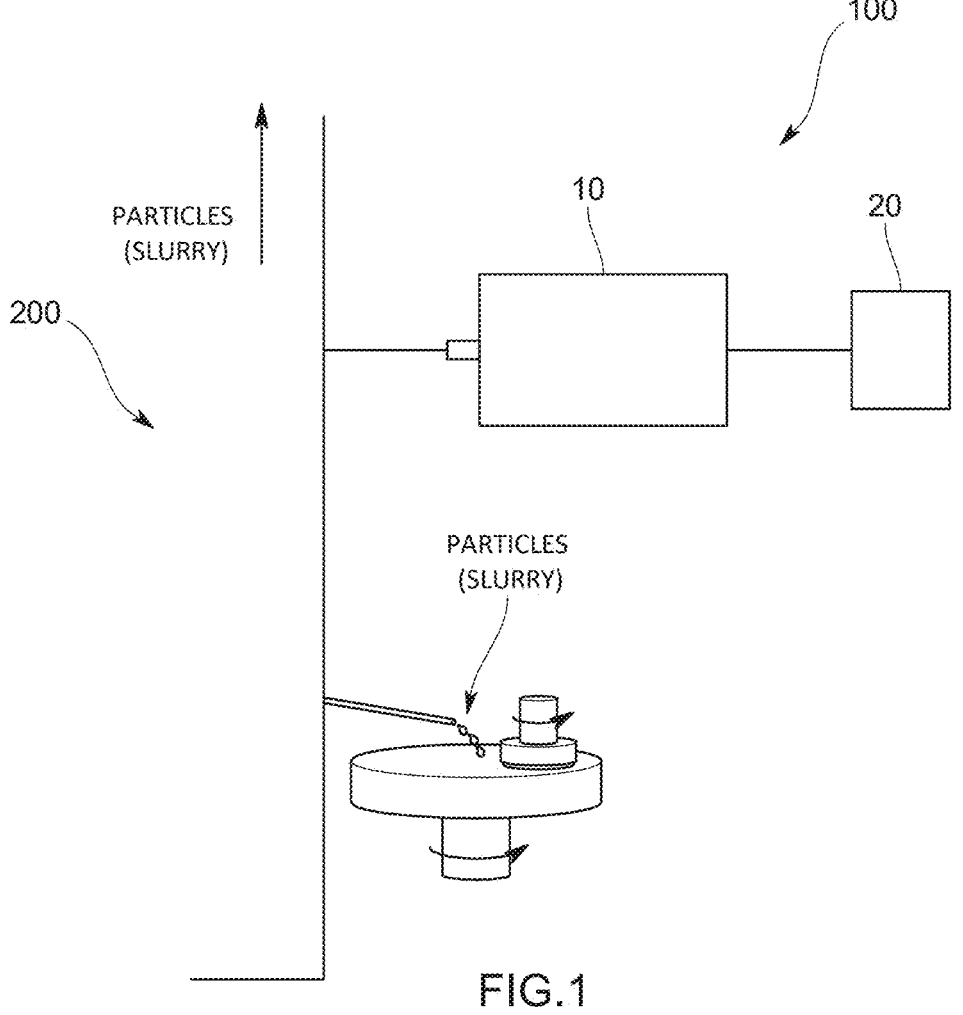
FIG. 1 is a schematic diagram illustrating a configuration of a particle size distribution measurement system according to an embodiment.

As illustrated in FIG. 1, this particle size distribution measurement system 100 according to the embodiment is used with a manufacturing system 200 that is used in a predetermined manufacturing process, such as a semiconductor manufacturing system, and makes online measurements of a particle size distribution of the particles used in the manufacturing system 200.

Specifically, as illustrated in FIG. 1, the particle size distribution measurement system 100 includes a dilution mechanism 10 that collects a sample containing particles from the manufacturing system 200 and dilutes the sample, and a particle size distribution measurement device 20 that measures the particle size distribution of the particles contained in the diluted sample.

Note that the sample for which a measurement is made includes a chemical component resulting in a correlation between the concentration of particles contained in the sample and the conductivity of the sample, and examples thereof include a polishing slurry such as a CMP slurry.

Because the particle size distribution measurement system 100 according to the embodiment is characterized by the dilution mechanism 10, the particle size distribution measurement device 20 will be briefly described to begin with, and the dilution mechanism 10 will then be described.

The particle size distribution measurement device 20 measures a particle size distribution using a dynamic light scattering (DLS) technique, and here, for example, can make particle size distribution measurements within the order of nanometers.

Figure 2:
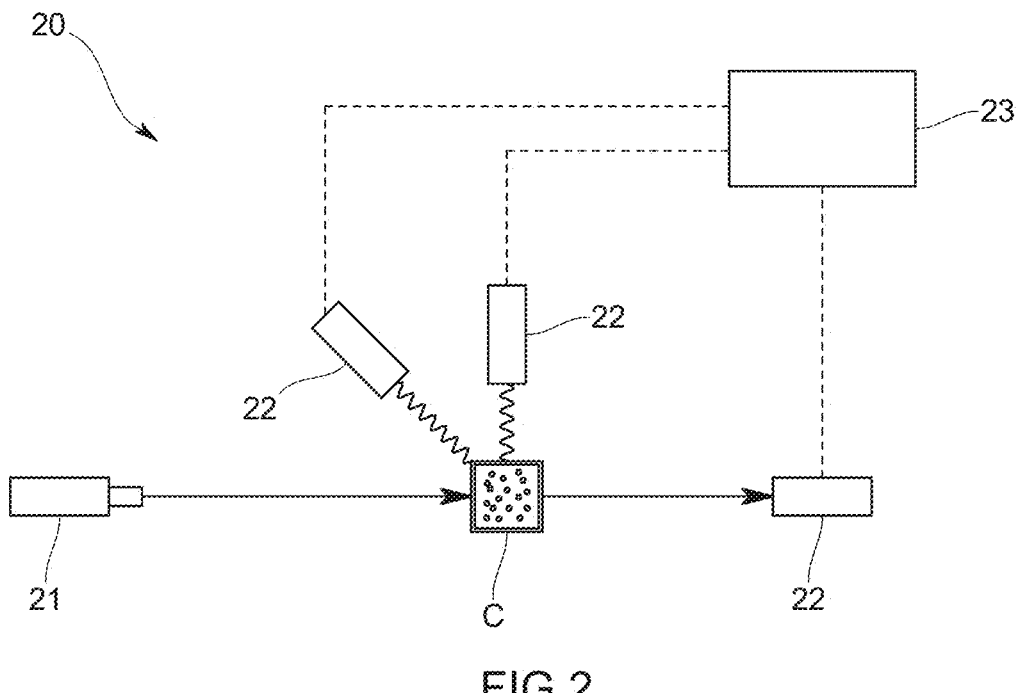
FIG. 2 is a schematic diagram illustrating a configuration of a particle size distribution measurement device according to the embodiment.

Specifically, as illustrated in FIG. 2, the particle size distribution measurement device 20 includes a laser light source 21 that emits laser light to a flow cell C storing therein a sample, one or more photodetectors 22 disposed around the flow cell C, and a computer serving as a computing unit 23 that calculates an autocorrelation function on the basis of a temporal change in scattered light intensity that is an actual measurement of the scattered light detected by the photodetectors 22, and calculates a particle size distribution from the autocorrelation function.

The dilution mechanism 10 will now be described.

Figure 3:
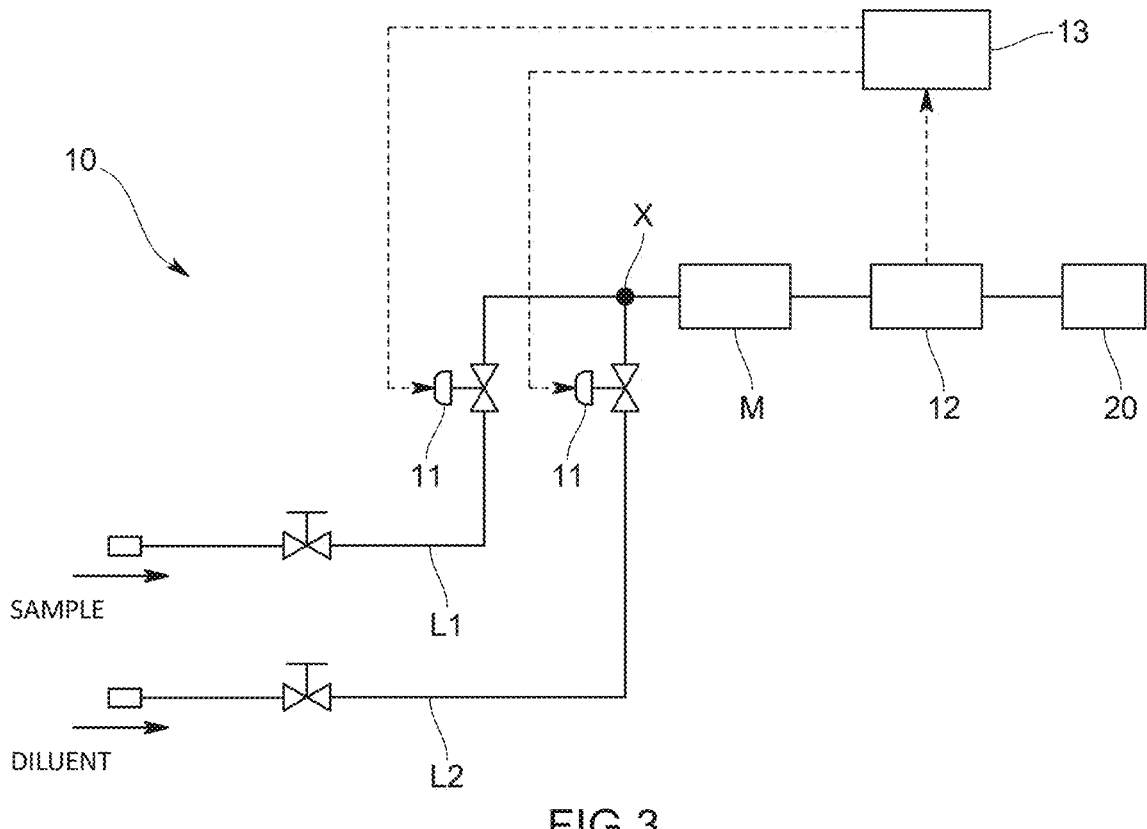
FIG. 3 is a schematic diagram illustrating a configuration of a dilution mechanism according to the embodiment.

As illustrated in FIG. 3, the dilution mechanism 10 includes a sample line L1 for collecting a sample containing particles from the manufacturing system 200 described above, a dilution line L2 through which a diluent for diluting the collected sample flows, a concentration adjusting unit 11 for adjusting the concentration of the particles in the sample having been diluted (hereinafter, also referred to as a diluted sample), a conductivity measuring unit 12 for measuring the conductivity of the diluted sample, and a control device 13 for controlling the concentration adjusting unit 11 using a measurement value measured by the conductivity measuring unit 12.

An upstream end of the sample line L1 is connected to a pipe making up the manufacturing system 200, and a downstream end is connected to the particle size distribution measurement device 20. The sample flowing through the pipe is collected and guided into the particle size distribution measurement device 20.

The dilution line L2 merges with the sample line L1. A downstream end of the dilution line L2 is connected to a predetermined merge point X established in the sample line L1. The diluent flowing through the dilution line L2 is a liquid not containing particles that is to be measured, and is water in the example described herein.

In the configuration described above, a mixer M such as a static mixer is provided on the downstream side of the merge point X of the sample line L1, to improve the performance for mixing the particles contained in the sample and the diluent.

The concentration adjusting unit 11 adjusts the concentration of the particles contained in the diluted sample, by adjusting the ratio of the sample collected via the sample line L1 and the diluent to be merged with the sample.

Specifically, as illustrated in FIG. 3, the concentration adjusting unit 11 is a fluid control valve provided to at least one of the sample line L1 and the dilution line L2, and, in the example described herein, is provided to both of the sample line L1 and the dilution line L2.

These fluid control valves control the flow rate or the pressure of the sample or the diluent, and the degrees by which the valves are opened are controlled by the control device 13 to be described later.

The conductivity measuring unit 12 is provided downstream of the merge point X in the sample line L1, and measures the conductivity of the diluted sample using a principle such as an AC two-electrode method or an electromagnetic induction.

The conductivity measuring unit 12 according to the embodiment is provided downstream of the mixer M described above, and is configured to transmit the measurement signals indicating the level of the measured conductivity to the control device 13 to be described later, in real time, wirelessly or over a wire, for example.

Physically, the control device 13 is a general-purpose or dedicated computer including components such as a CPU, a memory, and an AD converter.

Figure 4:
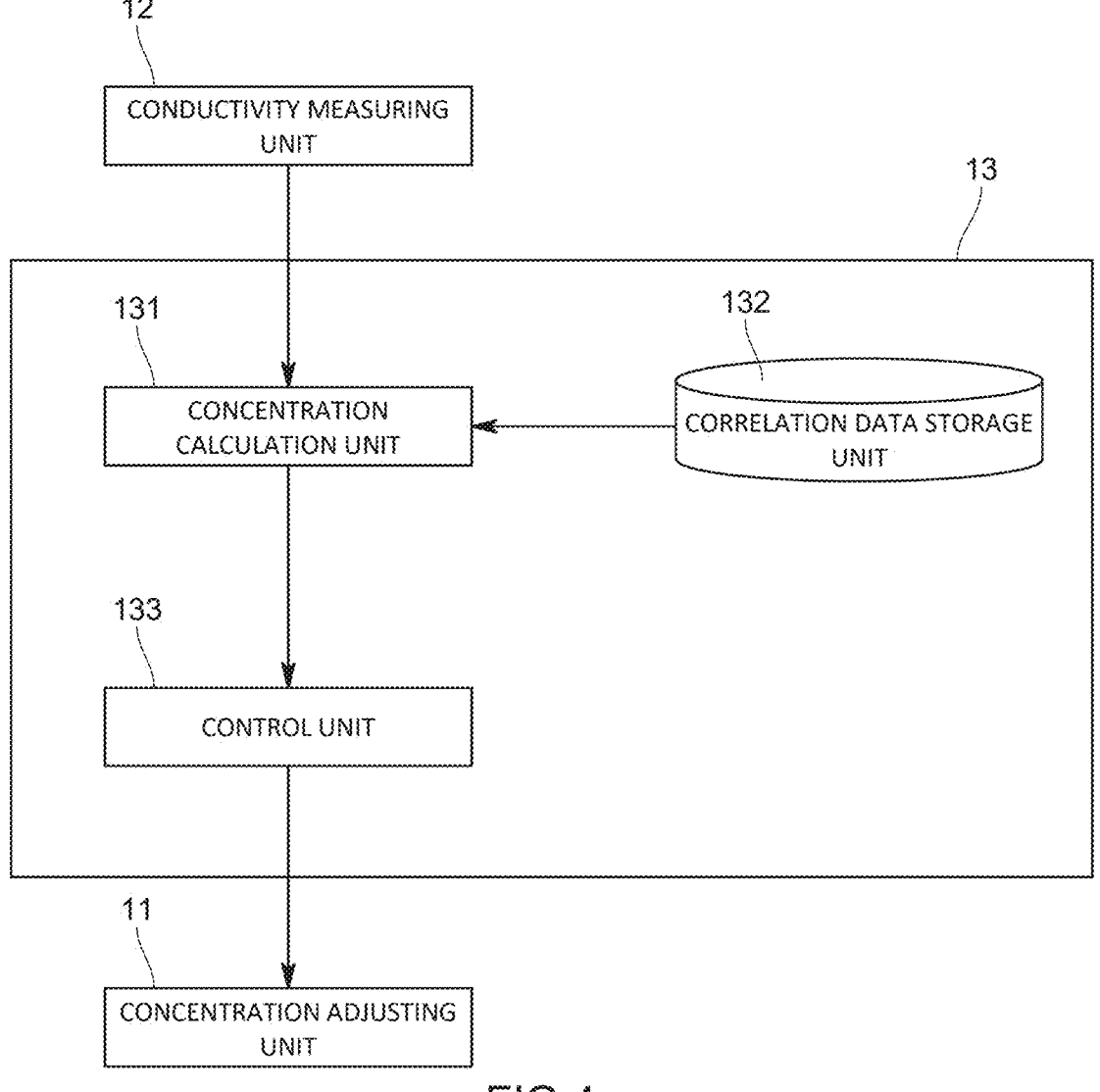
FIG. 4 is a functional block diagram illustrating functions of a control device according to the embodiment.

The control device 13 at least exerts a function as a control unit 133 that controls the concentration adjusting unit 11, as illustrated in FIG. 4, by the CPU and its peripheral devices cooperating with one another in accordance with the particle size distribution measurement program stored in the memory.

The control unit 133 controls the concentration adjusting unit 11 to bring the conductivity measured by the conductivity measuring unit 12 described above or a conductivity-related value that is a value calculated from the conductivity, to a predetermined target value. More specifically, the control unit 133 is configured to feedback-control the degree by which the fluid control valve is opened, so that the conductivity or the conductivity-related value is adjusted to the target value.

The control device 13 according to the embodiment exerts functions as a concentration calculation unit 131 and a correlation data storage unit 132, as illustrated in FIG. 4, in addition to the control unit 133 described above.

Figure 5:
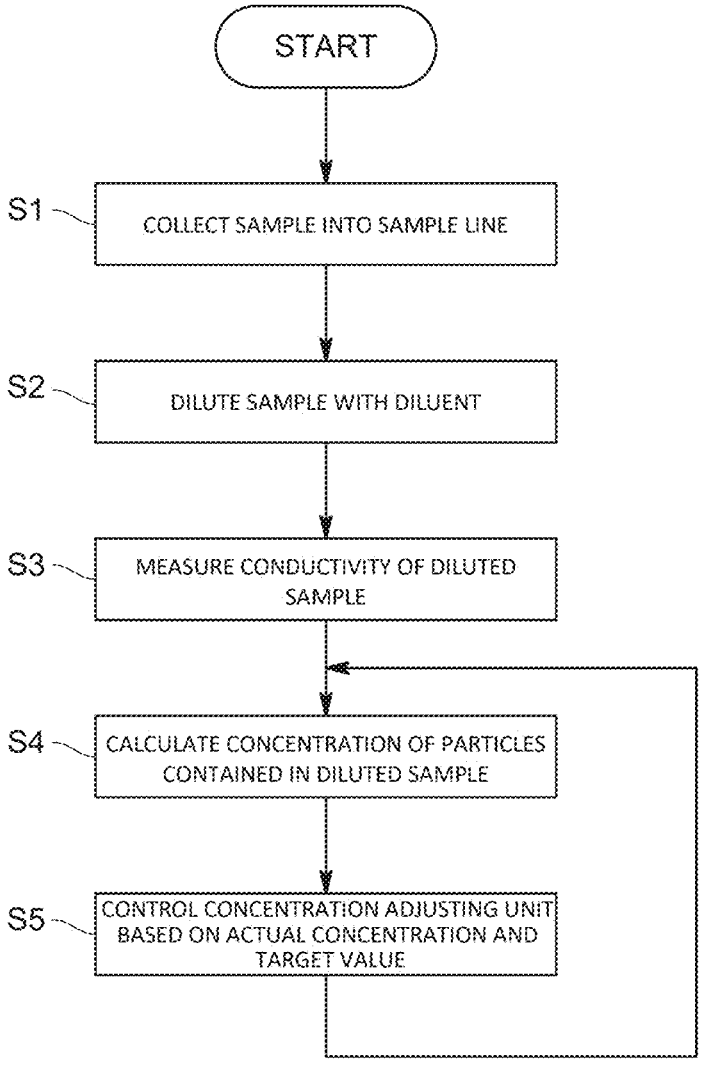
FIG. 5 is a flowchart illustrating an operation of the control device according to the embodiment.

Operations of the control device 13 will now be described with reference to the flowchart in FIG. 5, while describing the units implemented thereby at the same time.

To begin, with, once the dilution mechanism 10 according to the embodiment starts to operate, a sample flowing through the pipe of the manufacturing system 200 is collected into the sample line L1 (S1), diluted with the diluent (S2), and guided into the particle size distribution measurement device 20.

In this process, the conductivity of the diluted sample is measured by the conductivity measuring unit 12, and measurement signals indicating the conductivity levels are sequentially transmitted to the control device 13 (S3).

In this embodiment, the concentration calculation unit 131 then calculates the concentration of the particles (hereinafter, referred to as an actual concentration) contained in the diluted sample, as the conductivity-related value described above, using the conductivity measured by the conductivity measuring unit 12 (S4).

More specifically, the concentration calculation unit 131 acquires correlation data indicating a correlation between the conductivity of the diluted sample and the actual concentration of the particles contained in the diluted sample from the correlation data storage unit 132, calculates the actual concentration using the correlation data and the measured conductivity, and outputs the calculated actual concentration to the control unit 133.

Examples of the correlation data include a calculation formula for calculating the actual concentration from the conductivity, and a lookup table for finding the actual concentration from the conductivity.

The control unit 133 then controls the concentration control unit, which has been described above, to bring the actual concentration calculated by the concentration calculation unit 131 to a predetermined target value (S5).

More specifically, the control unit 133 compares the actual concentration with the target value, calculates the control amount corresponding to the difference, and feedback-controls the degree by which the fluid control valve is opened on the basis of the control amount.

The control device 13 according to the embodiment is configured to repeat the particle concentration calculation in S4 and the control of the concentration adjusting unit 11 in S5. While this operation is repeated, the particle size distribution measurement device 20 measures the particle size distribution of the particles contained in the diluted sample guided thereinto.

With the particle size distribution measurement device 20 having the configuration described above, the conductivity of the diluted sample is measured, and the concentration control unit is controlled to adjust the actual concentration of the diluted sample calculated from the conductivity, to the target value. Therefore, even with a sample having a variable particle size distribution, it is possible to control the particle concentration of the sample highly accurately, unlike the configuration that controls the concentration using the intensity of transmitted light or scattered light. As a result, it becomes possible to ensure the measurement accuracy of the particle size distribution measurement device 20.

As a result, the particle size distribution measurement device 20 according to the embodiment facilitates online measurements of the particle size distributions of particles used in the manufacturing system 200.

The present invention is not limited to the embodiment described above.

For example, the control unit 133 according to the embodiment controls the concentration control unit to bring the actual concentration to the target value, but may also be configured to control the concentration control unit to adjust the conductivity measured by the conductivity measuring unit 12 to a target value.

In this case, the functions of the concentration calculation unit 131 and the correlation data storage unit 132 in the control device 13 may be omitted.

The control unit 133 may be also configured to control the concentration control unit to bring a conductivity-related value such as electric conductivity degree, electric conductivity, electric resistance, electric resistivity, or impedance calculated from the electric conductivity, to a target value.

In addition, the particle size distribution measurement system 100 may have a function as a display unit that outputs the particle size distribution that is a measurement result of the particle size distribution measurement device 20, and conductivity that is a measurement result of the conductivity measuring unit 12 or a conductivity-related value calculated from the conductivity, comparably on the same display or separate displays.

Furthermore, a pycnometer may be provided instead of the conductivity measuring unit 12, and the control unit 133 may be configured to control the concentration control unit to bring a measurement of the specific gravity of the diluted sample measured by the pycnometer or a value calculated from the specific gravity, to a target value.

The present invention is not limited to the embodiment described above, and it should be needless to say that other various modifications may be made within the scope not departing from the gist of the present invention.

INDUSTRIAL APPLICABILITY

According to the present invention, in the particle size distribution measurement using the dynamic light scattering technique, even when there is variability in the particle size distribution of the particles contained in the sample, it is possible to control the particle concentration of the sample accurately so that accurate measurements can be obtained.

REFERENCE SIGNS LIST

100 particle size distribution measurement system
200 manufacturing system
10 dilution mechanism
20 particle size distribution measurement device
L1 sample line
L2 dilution line
X merge point
11 concentration adjusting unit
12 conductivity measuring unit
13 control device
131 concentration calculation unit
132 correlation data storage unit
133 control unit

The invention claimed is:

1. A dilution mechanism used with a particle size analyzer that measures a particle size distribution using a dynamic light scattering technique, the dilution mechanism comprising:
    a sample line that guides a sample containing particles to the particle size analyzer;
    a dilution line that merges with the sample line and through which a diluent flows;
    at least one fluid control valve configured to adjust a concentration of particles contained in diluted sample;
    a conductivity measuring unit that measures a conductivity of the diluted sample; and
    a hardware processor that controls the at least one fluid control valve to bring the conductivity measured by the conductivity measuring unit or to bring a conductivity-related value that is a value calculated from the conductivity, to a predetermined target value.

2. The dilution mechanism according to claim 1, wherein the hardware processor calculates a concentration of the particles in the diluted sample as the conductivity-related value, from the conductivity measured by the conductivity measuring unit, wherein
    the hardware processor controls the at least one fluid control valve to bring the calculated concentration to the target value.

3. The dilution mechanism according to claim 1, further comprising a correlation data storage that stores correlation data indicating a correlation between the conductivity of the diluted sample and the particle concentration of the sample, wherein
    the hardware processor is configured to calculate the concentration of the particles contained in the diluted sample using the correlation data.

4. The dilution mechanism according to claim 1, wherein the at least one fluid control valve is provided to at least one of the sample line and the dilution line.

5. The dilution mechanism according to claim 1, wherein the sample line is configured to collect the sample from a manufacturing system used in a predetermined manufacturing process.

6. A particle size distribution measurement system comprising:
    the dilution mechanism according to claim 1; and
    a particle size analyzer that measures the particle size distribution of particles contained in the sample diluted by the dilution mechanism, using the dynamic light scattering technique.

7. The particle size distribution measurement system according to claim 6, wherein the sample contains a chemical component resulting a correlation between the concentration of particles contained in the sample and the conductivity of the sample.

8. A particle size distribution measurement method for measuring a particle size distribution using a dynamic light scattering technique, the method comprising:
    a step of guiding a sample containing particles to a particle size analyzer through a sample line;
    a step of merging a diluent to the sample line;
    a step of adjusting a concentration of the particles contained in the diluted sample using at least one fluid control valve;
    a step of measuring conductivity of the diluted sample using a conductivity measuring unit; and
    a step of controlling the at least one fluid control valve to bring the conductivity measured by the conductivity measuring unit or to bring a conductivity-related value that is a value calculated from the conductivity, to a predetermined target value.

9. A non-transitory computer readable medium storing a particle size distribution measurement program used in a particle size distribution measurement system comprising: 5 a particle size analyzer that measures a particle size distribution using a dynamic light scattering technique;

a sample line that guides a sample containing particles to the particle size analyzer;

a dilution line that merges with the sample line and 10 through which a diluent flows;

at least one fluid control valve that adjusts a concentration of the particles in the diluted sample; and a conductivity measuring unit that measures conductivity of the diluted sample, the program causing a computer 15 to control the at least one fluid control valve to bring the conductivity measured by the conductivity measuring unit or to bring a conductivity-related value that is a value calculated from the conductivity, to a predetermined target value. 20

* * * * *